United States Patent [19]

Miller et al.

[11] Patent Number: 4,894,407

[45] Date of Patent: Jan. 16, 1990

[54] COMPOSITION FOR EXTRACTING GOLD AND SILVER ANIONS FROM ALKALINE SOLUTIONS AND PROCESSES FOR MAKING SAME

[75] Inventors: Jan D. Miller, Salt Lake City, Utah; Spiro D. Alexandratos, Knoxville, Tenn.

[73] Assignee: University of Utah, Salt Lake City, Utah

[21] Appl. No.: 232,309

[22] Filed: Aug. 15, 1988

Related U.S. Application Data

[63] Continuation of Ser. No. 774,549, Sep. 10, 1985, abandoned, which is a continuation-in-part of Ser. No. 527,311, Aug. 26, 1983, Pat. No. 4,540,435.

[51] Int. Cl.$^4$ ............................................. C08K 3/10
[52] U.S. Cl. ................... 524/413; 524/547; 525/333.3; 525/340; 75/118 R

[58] Field of Search ................................. 524/413, 547

[56] References Cited

U.S. PATENT DOCUMENTS 2,764,562  9/1956  Drake ................................. 260/2.2
4,556,508  12/1985  Tomibe et al. ...................... 524/413

FOREIGN PATENT DOCUMENTS 726925  3/1955  United Kingdom.

Primary Examiner—Joseph L. Schofer
Assistant Examiner—Bernard Lipman
Attorney, Agent, or Firm—Trask, Britt & Rossa

[57] ABSTRACT

An extraction composition useful for extracting gold or silver values from aqueous systems containing gold or silver cyanide anions. Useful extractions include organic oxides of phosphrous and sulfur attached to an inert resinous substrate.

7 Claims, 2 Drawing Sheets

COMPOSITION FOR EXTRACTING GOLD AND SILVER ANIONS FROM ALKALINE SOLUTIONS AND PROCESSES FOR MAKING SAME

This is a continuation of application Ser. No. 774,549, filed Sept. 10, 1985 now abandoned which is a continuation-in-part of U.S. Ser. No. 527,311, filed Aug. 25, 1983, entitled SOLVENT EXTRACTION OF GOLD AND SILVER ANIONS UNDER ALKALINE CONDITIONS, now U.S. Pat. No. 4,540,435, which is related to U.S. Ser. No. 526,423, filed Aug. 25, 1983, entitled ION EXCHANGE EXTRACTION OF METALLIC AND NON-METALLIC ANIONS BY CONTROL OF THE BASICITY OF AMINE EXTRACTANTS, filed by one of the instant coinventors, the contents of said applications being incorporated herein by reference. This application is also related to U.S. Ser. No. 774,548, filed Sept. 10, 1985, entitled DIRECT GOLD ELECTROLYSIS FROM A LOADED ORGANIC PHASE, which is also a continuation-in-part of U.S. Pat. No. 4,540,435.

BACKGROUND OF THE INVENTION

1. Field

The present invention relates to the recovery of metal values from aqueous systems by extraction with an organic solvent or resin having minimal aqueous solubility which has strong solvating pendant groups.

2. Prior Art

Extraction of metal values from aqueous systems by means of ion exchange techniques such as solvent extraction has achieved prominence in hydrometallurgical processing technology.

Ion exchange and solvent extraction are widely used in hydrometallurgy and water purification. Solvent extraction which is carried out by various organic liquid extractants, with or without diluents or modifiers, has been used in hydrometallurgy for the recovery of uranium, copper, and other metals. Synthetic resins which contain functional groups similar to those used in solvent extraction are also widely used for waste water purification and in hydrometallurgy for the separation of metallic ions. The use of resins with active functional groups is a form of extraction that involves a solid substrate. Such a substrate may be, but need not be, active in the ion extraction process. It may function merely as a carrier for an active extractant.

Recovery of metal values from aqueous systems by organic acids, amines, phosphorus oxide compounds and the like is frequently accomplished from acidic systems. Such extraction is conducted in systems having a pH of less than 7.

Solvent extraction of gold from alkaline cyanide solution has not been practiced heretofore in industry. Laboratory experiments reported in the literature indicate that the extraction of gold from cyanide solutions is possible with weak base amines and neutral extractants such as long chain alcohols, ketones, and the like under acidic conditions.

Extraction of metal values from cyanide systems is generally not practiced industrially inasmuch as cyanide gas may evolve at low pH conditions in which solvent extraction procedures employing amines and the like have been practiced.

DESCRIPTION OF THE INVENTION

Figure 1:
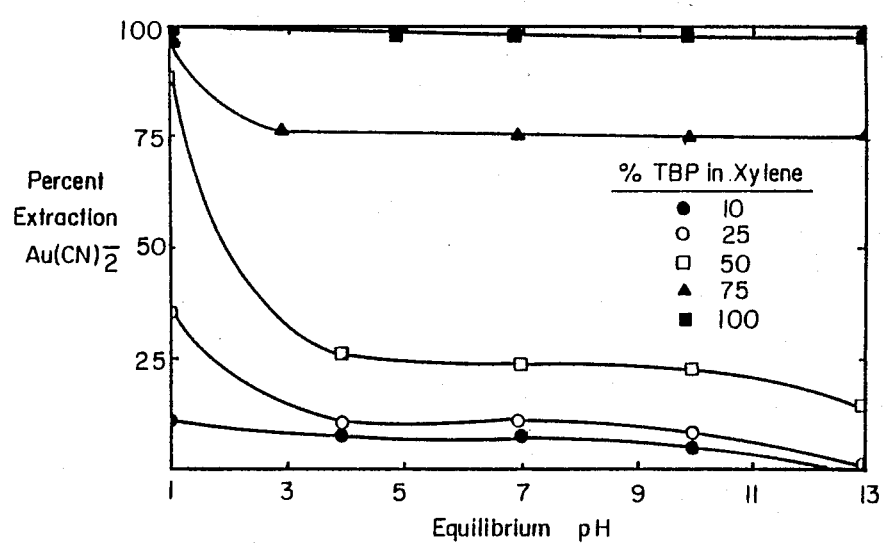
FIG. 1 is a graph depicting percent extraction of gold from a solution of $KAu(CN)_2Au(CN)_2$ (1.0 gram gold per liter in 0.5M $Na_2SO_4$) versus pH for varying concentrations of tributyl phosphate in xylene.
Figure 2:
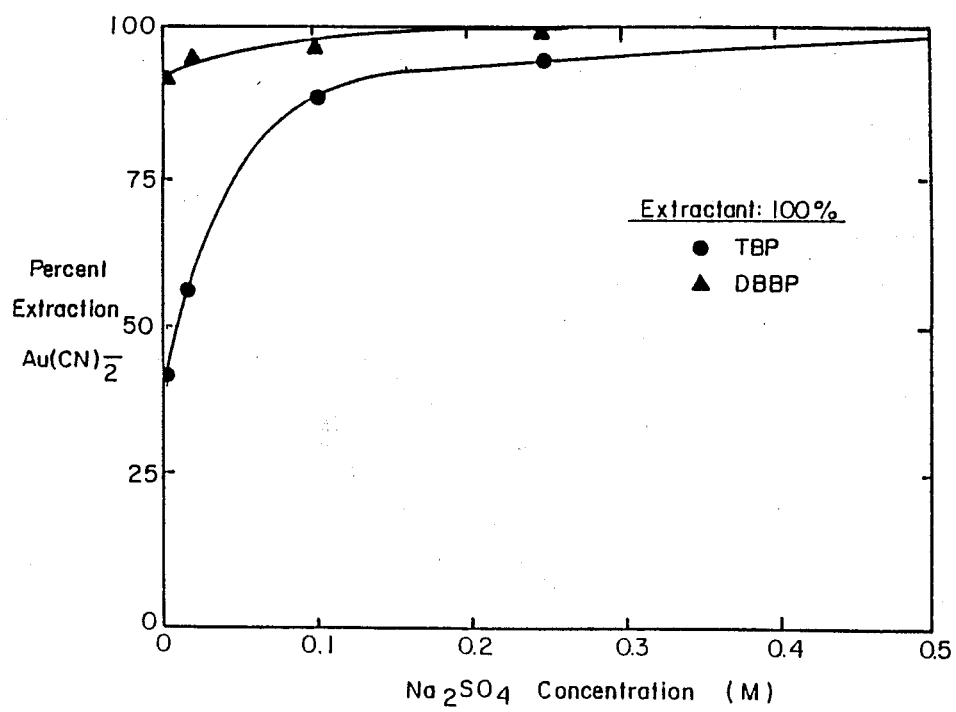
FIG. 2 is a graph plotting percent extraction versus $Na_2SO_4$ concentration for the extraction of gold from a 1.0 g/liter $KAu(CN)_2$ solution by tributyl phosphate and dibutyl butyl phosphonate.
Figure 3:
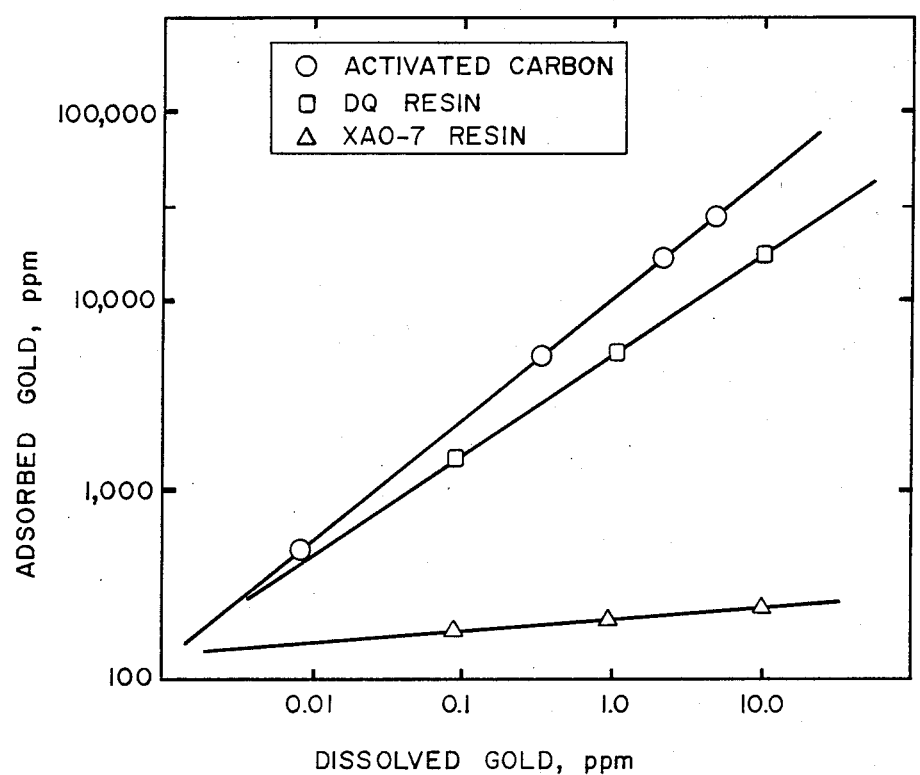
FIG. 3 compares the loading isotherm for a synthesized extractant resin of the instant invention to a commercially available neutral extractant resin Amberlite® XAD-7, and to activated carton at pH 10 and 22° C.

A composition for extracting gold and silver values from an aqueous system through employment of a solvating solid extractant under basic conditions has been invented. In particular, organic oxides of phosphorus and sulfur present as groups pendant from a neutral resinous material can be utilized as effective extractants for recovering gold and silver from aqueous systems containing gold or silver cyanide anions. In certain instances, the addition of an indifferent electrolyte to the aqueous phase may be required to obtain appreciable extraction, i.e. recovery of metal values.

Traditionally ion exchange resins have been used for solution concentration and purification of leach liquors encountered in hydrometallurgical processes. Particular success is well known in the case of the uranium industry. On the other hand, neutral resin adsorbents, solvation resins, have had little utility in hydrometallurgy. Such commercial resins are cross-linked polystyrenes and polyacrylates (e.g., XAD-7) which have been used primarily for the removal of various organic compounds from aqueous process streams.

Certain neutral resins have exhibited potential for the recovery of gold from alkaline cyanide solutions via adsorption mechanisms. The adsorption process seems to have characteristics similar to that of activated carbon adsorption (dependence on ionic strength, temperature, etc.). Gold loading of commercially available neutral resin adsorbents (e.g., XAD-7) is not substantial, but certain modifications in the synthesis of these resins allow for gold loadings equivalent to those observed in carbon adsorption.

The activity and effectiveness of organic phosphorus oxides such as tributyl phosphate (TBP) and dibutyl butyl-phosphonate (DBBP) in recovering gold from alkaline cyanide solutions is very pronounced. Typically extraction of gold by TBP heretofore has been known from acidic solution due to the function of the uncharged aurocyanic acid, e.g. $HAu(CN)_2$. The instant invention, however, does not require generation of such a species.

In the instant invention, organic phosphorus oxides have shown significantly greater effectiveness than other commercially available solvating extractants such as methyl isobutyl ketone (MIBK), Amberlite® XAD-7 (XAD-7) and dibutyl diethylene glycol (DBC) in extracting gold from cyanide solutions.

Cyanide anion complexes of gold and silver are effectively extracted from aqueous media by contacting such media with a strong solvating extractant such as an organic phosphorus oxide under alkaline conditions.

For the purposes of the instant invention, the extractant is attached to a resinous solid substrate.

Extraction of gold and silver from alkaline cyanide solutions by a strong solvating extractant may be effectively conducted at various salt concentrations in an aqueous system. The need for salt addition, i.e. ionic strength adjustment, is dependent upon the strength, i.e. type, of extractant utilized. For example, TBP requires an ionic strength corresponding to about 0.5M $Na_2SO_4$ in order to achieve essentially complete recovery of gold from alkaline cyanide solutions. Salts useful as indifferent electrolytes include salts of alkali metals and alkaline earth metals. The macroporous polystyrene beads described hereinafter display similar activity.

Suitable electrolytes for inclusion in the aqueous medium are salts of alkali metals such as sodium and potassium, and of alkaline earth metals such as calcium, magnesium, and the like. The anion portion of such salts are typically chlorides, sulfates, nitrates, cyanides and the like. Many such salts are naturally present in leach liquors containing gold or silver cyanide anions as well as other ionic constituents. Additional electrolyte may be included to bring the ionic strength of the system into a preferred range.

Typical solvating extractants are organic sulfur oxides such as organic sulfoxides and sulfones, organic phosphorus oxides such as tributyl phosphate, dibutyl butyl phosphonate, butyl dibutyl phosphinate, tributyl phosphine oxide and trioctyl phosphine oxide or phosphorus groups attached directly to a substrate. These phosphorus oxides are listed in an ascending order of strength. The lower alkyl extractants are typically available in liquid forms. However, some oxides such as trioctyl phosphine oxide are solid. Solid systems comprising the instant invention are extractants of the types described above, partially absorbed in, or otherwise attached to, a resinous substrate or phosphorus oxide functional group chemically bonded to a polymeric resin.

Other alkyl moieties; for example, propyl, pentyl, hexyl, heptyl and the like may be substituted for the butyl and octyl groups in the above-listed compounds.

Many phosphorus oxides useful in the present invention have the following structure:

$$O=P\begin{array}{c}R_1\\-R_2\\R_3\end{array}$$

wherein $R_1$ and $R_2$ may be the same or different alkyl or alkoxy groups. $R_3$ may be the same or different alkyl or alkoxy group or may be a phenyl group. The alkyl group and the alkyl portion of the alkoxy group are generally a hydrocarbon having less than about ten carbon atoms, but preferably less than about six carbon atoms.

Organic sulfur oxides, such as sulfoxides and sulfones having similar organic moieties attached, may perform in a similar manner to the phosphorus oxides described herein.

To practice the instant invention, the substrate to which these strong solvating extractants are attached should be a water insoluble resinous material. Satisfactory results have been obtained using macroporous polystyrene beads to which have been attached organic phosphonate ester moieties as the strong solvating extractant. Satisfactory results can also be obtained by swelling an inert polymer with a suitable solvent, and thereafter allowing the aliphatic "tails" of the organic phosphorus or sulfur oxides to be absorbed into the swollen polymer.

Increased porosity of the solid substrate increases the surface area yielding quicker, more thorough adsorption of silver and gold cyanide anions.

When modified macroporous polystyrene beads are used, the gold or silver values may be stripped from the beads by either reextracting the gold or silver values from the beads for subsequent recovery and refinement, or by direct incineration and refinement of the gold or silver-laden beads.

EXAMPLE I

The extractant is synthesized from neutral cross-linked polystyrene beads, which is a particular advantage given the commercial availability of the beads. A high apparent capacity is available by such macroporous beads having a low density and, hence, easy access by the pregnant aqueous solution to the coordinating sites. For example, a resin synthesized with 50 volume percent porosity consists of 0.30–0.45 g dry polymer/g wet resin. Such a polymer support is synthesized from the copolymerization of styrene with divinyl benzene in the presence of a diluent such as 1 methyl 2 pentanol via suspension polymerization. Chloromethylation leads to complete substitution with chloromethylene groups thus making the support more reactive to the subsequent phosphorylation reaction.

Alternatively, the support can be prepared directly from vinylbenzyl chloride thus obviating the chloromethylation step. Phosphorylation occurs by reacting the support with $PCl_3$ in the presence of a Friedel-Crafts catalyst such as $AlCl_3$. Any level of catalyst greater than 0.25 mol/mol styrene moieties can be used with 1.2 mol/mol styrene moieties providing satisfactory results. A temperature above room temperature is required while refluxing with $PCl_3$ (73° C.) yielding a convenient rate of reaction; a four hour contact time is usually sufficient for the reaction to occur. After cooling back to room temperature, the liquid is siphoned from the beads, and they are washed thoroughly with toluene using successive wash solutions. Formation of the phosphonate groups is accomplished by quenching the beads in an excess of a solution containing ethanol/pyridine (1:1 mole ratio) either with or without the presence of toluene in the solution. The quench is exothermic and the temperature should not be allowed to rise above 20° C. through exterior cooling of the flask. Upon complete addition and a one hour stir, the liquid is decanted off and the process repeated. The resin should then be washed in successive solutions of 95% aqueous ethanol, 50% aqueous ethanol, water, 1N NaOH, water, 1N HCl, and water until neutral. The resin can be analyzed by a sodium hydroxide titration, phosphorus elemental analysis, and chlorine elemental analysis. The reaction scheme is outlined by equation (1).

Equation (1)

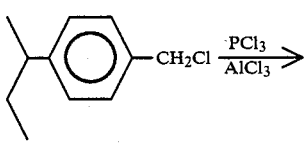

-continued

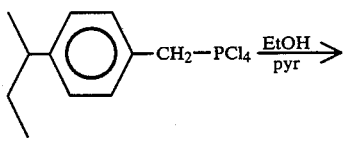

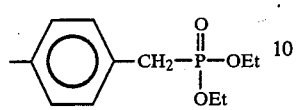

EXAMPLE II

Suspension polymerization is used to synthesize the support network in the form of beads having approximately 1 mm diameter. An aqueous phase consisting of 0.96 g gelatin, 11.90 g poly(diallyldimethylammonium chloride), 6.33 g boric acid in 316.5 mL $H_2O$ adjusted to pH 10.3 is poured into a 1 liter flask equipped with condenser, nitrogen purge, thermometer, temperature control device, and stirrer. The organic phase (134.95 g vinylbenzyl chloride, 13.55 g divinylbenzene (55.4% DVB isomers, remainder as ethylstyrene isomers), 1.50 g benzoyl peroxide, 150 g 4-methyl-2-pentanol) is then added to the flask, the suspension set at a stir rate of 185 rpm, followed by steam distillation of the polymus beads over six hours. Upon cooling, the beads are water-washed, dried, and sieved.

In order to functionalize these beads, a weighed amount of polymer beads (15 g) is contacted with $PCl_3$ for one hour followed by the addition of 1.2 mol $AlCl_3$/mol styrene moieties. The mixture is stirred vigorously and heated to reflux over a one hour period where it is held for four hours. Upon cooling to room temperature, the $PCl_3$ is siphoned off of the beads and they are washed five times with toluene washes, each wash lasts for one hour. The beads are then allowed to stir in fresh toluene for twelve hours followed by one last toluene wash. The toluene is removed and 50 ml of toluene is again added for fluidity to allow for gentle stirring as the quench solution (50 wt% toluene, 0.6 mol ethanol/0.6 mol pyridine) is slowly added while keeping the temperature between 0°-20° C. After stirring for one hour, the solution is siphoned from the beads and an equal amount of fresh quench solution is added and a one hour stir time allowed. The liquid is siphoned once more and the resin is given its final wash sequence of 500 mL each (with a one hour stir) of 95% ethanol, ethanol, water, in NaOH, water, 1N HCl, and water until neutral.

Analysis is by the standard base titration, phosphorus elemental analysis, and chlorine elemental analysis.

We claim:

1. A composition comprising;
a solid substrate;
a strong solvating extractant attached to said solid substrate, wherein said strong solvating extractant is a phosphonate ester having the following formula:

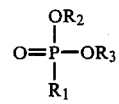

wherein $R_1$ is poly (vinyl benzyl) and $R_2$ and $R_3$ are alkyl groups having from one to ten carbon atoms; and gold cyanide anions or silveer cyanide anions in contact with said strong solvating extractant.

2. A composition comprising:
a solid substrate;
a strong solvating extractant attached to said solid substrate, wherein said strong solvating extractant is a phosphonate ester having the following formula:

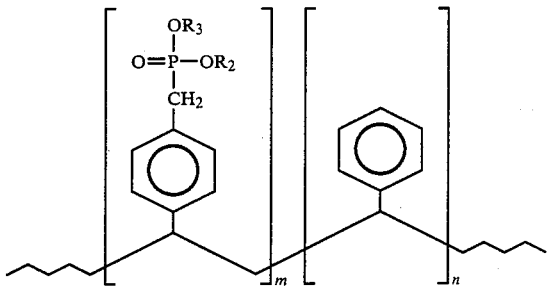

wherein the depicted bracketus portions are repeating monouers where m=0.5, n=0.5 and $R_2$ and $R_3$ are alkyl groups having from one to ten carbon atoms each; and gold cyanide anions or silver cyanide anions in contact with said strong solvating extractant.

3. The composition of claim 1 wherein the strong solvating extractant is chemically bonded to the solid substrate.

4. The composition of claim 1 wherein said solid substrate is substantially insoluble in alkaline and acidic aqueous systems.

5. The composition of claim 1 wherein said solid substrate is porous.

6. The composition of claim 5 wherein said solid substrate is comprised of macroporous polystyrene beads.

7. The composition of claim 1 wherein said solid substrate is a particulate porous substrate.

* * * * *

UNITED STATES PATENT OFFICE
CERTIFICATE OF CORRECTION

Page 1 of 2

Patent No. 4,894,407           Dated   JANUARY 16, 1990

Inventor(s)  Jan D. Miller;  Spiro D. Alexandratos

It is certified that error appears in the above-identified patent and that said Letters Patent is hereby corrected as shown below:

In Abstract, line 3, change "extractions" to --extractants--.

In column 4, line 27, change "1" to --4--.

In column 5, line 51, delete "ethanol" insert therefore --50%--.

In column 6, line 15, change "silveer" to --silver--.

In column 6, line 37, change "bracketus" to --bracketed--.

In column 6, line 38, change "monouers" to --monomeric--.

UNITED STATES PATENT AND TRADEMARK OFFICE
CERTIFICATE OF CORRECTION

Page 2 of 2

PATENT NO. : 4,894,407
DATED : January 16, 1990
INVENTOR(S) : Jan D. Miller; Spiro D. Alexandratos It is certified that error appears in the above-identified patent and that said Letters Patent is hereby corrected as shown below:

In column 6, line 37, change "braketus" to --bracketed--.

In column 6, line 38, change "monouers" to --monoumers--.

Signed and Sealed this

Seventh Day of July, 1992

Attest:

DOUGLAS B. COMER

*Attesting Officer*     Acting Commissioner of Patents and Trademarks